US010081726B2

(12) United States Patent
Pukánszky et al.

(10) Patent No.: US 10,081,726 B2
(45) Date of Patent: Sep. 25, 2018

(54) COMPOSITE COMPRISING A CELLULOSE-BASED FILLER

(71) Applicant: Borealis AG, Vienna (AT)

(72) Inventors: Béla Pukánszky, Budapest (HU); Karoly Renner, Györzámoly (HU); Szabolcs Kalmar, Úrhida (HU); Thomas Lummerstorfer, Gramastetten (AT); Hermann Braun, Linz (AT); Petar Doshev, Linz (AT); Michael Jerabek, Leonding (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/747,623

(22) PCT Filed: Aug. 11, 2016

(86) PCT No.: PCT/EP2016/069113
§ 371 (c)(1),
(2) Date: Jan. 25, 2018

(87) PCT Pub. No.: WO2017/029181
PCT Pub. Date: Feb. 23, 2017

(65) Prior Publication Data
US 2018/0215908 A1 Aug. 2, 2018

(30) Foreign Application Priority Data
Aug. 14, 2015 (EP) .................... 15181060

(51) Int. Cl.
C08L 23/12 (2006.01)
C08J 5/04 (2006.01)
C08J 5/10 (2006.01)

(52) U.S. Cl.
CPC .............. C08L 23/12 (2013.01); C08J 5/045 (2013.01); C08J 5/10 (2013.01); C08J 2323/12 (2013.01); C08J 2323/26 (2013.01); C08J 2423/12 (2013.01); C08J 2423/26 (2013.01); C08L 2205/02 (2013.01); C08L 2205/035 (2013.01); C08L 2207/02 (2013.01); C08L 2308/00 (2013.01)

(58) Field of Classification Search
CPC .............. C08L 23/12; C08L 2205/06; C08L 2205/025; C08L 2205/035; C08L 2207/00; C08J 5/045; C08J 5/10; C08J 2423/12; C08J 2423/26; C08J 2323/12; C08J 2323/26
See application file for complete search history.

(56) References Cited

U.S. PATENT DOCUMENTS

| 2005/0009960 A1* | 1/2005 | Ton-That | C08F 255/00 524/27 |
| 2012/0115995 A1* | 5/2012 | Lederer | C08L 23/12 524/100 |
| 2015/0045479 A1 | 2/2015 | Yang et al. | |
| 2015/0267087 A1* | 9/2015 | Botros | C08L 23/10 524/151 |

FOREIGN PATENT DOCUMENTS

| EP | 0 491 566 | 6/1992 |
| EP | 1 234 853 | 8/2002 |
| EP | 0 887 379 | 12/2004 |
| EP | 2 551 299 | 1/2013 |
| EP | 2 610 270 | 7/2013 |
| EP | 2 610 271 | 7/2013 |
| EP | 2 610 272 | 7/2013 |
| WO | 87/07620 | 12/1987 |
| WO | 92/12182 | 7/1992 |
| WO | 92/19653 | 11/1992 |
| WO | 92/19658 | 11/1992 |
| WO | 99/24478 | 5/1999 |
| WO | 99/24479 | 5/1999 |
| WO | 00/68315 | 11/2000 |
| WO | 2004/000899 | 12/2003 |
| WO | 2004/111095 | 12/2004 |
| WO | 2012/007430 | 1/2012 |

OTHER PUBLICATIONS

Karnani, R., et al.; Polymer Engineering and Science, 1997, vol. 37, No. 2, p. 476-483 (Year: 1997).*
Maier, C., et al.; Polypropylene: The Definitive User's Guide and Databook, 1998, p. 11-25 (Year: 1998).*
Busico, et al., "Alk-1-ene Polymerization in the Presence of a Monocyclopentadienyl Zirconium(iv) Acetamidinate catalyst: Microstructural and Mechanistic Insightsa," Macromolecular Journals, 2007, vol. 28, pp. 1128-1134, WILEY-VCH Verlag GmbH & Co. KGaA, Weinheim.
Cheng, H.N., "13C NMR Analysis of Ethylene-Propylene Rubbers," Macromolecules, 1984, vol. 17, No. 10, pp. 1950-1955, American Chemical Society.
Kakugo, et al., "C NMR Determination of Monomer Sequence Distribution in Ethylene-Propylene Copolymers Prepared with s-TiCL13-AL (C2H5)2Cl," Macromolecules, vol. 15, 1982, pp. 1150-1152, American Chemical Society.
Glossary of Basic Terms in Polymer Science, Pure and Applied Chemistry, IUPAC Recommendations 1996, 2287-2311, vol. 68.
Resconi, et al., "Selectivity in Propene Polymerization with Metallocene Catalysts," Chemical Reviews, 2000, vol. 100, pp. 1253-1345, American Chemical Society.
Singh, et al., Triad Sequence Determination of Ethylene-Propylene Copolymers—Application of Quantitative 13C NMR, Polymer Testing, 29, 2009, pp. 475-479, Elsevier, Ltd.

(Continued)

Primary Examiner — Robert S Jones
(74) Attorney, Agent, or Firm — Lowenstein Sandler LLP

(57) ABSTRACT

Composite comprising a heterophasic propylene copolymer (HECO), a high density polyethylene, a cellulose-based filler and a compatibilizer.

20 Claims, No Drawings

(56) References Cited

OTHER PUBLICATIONS

Wang, et al., "Structural Analysis of Ethylene/Propylene Copolymers Synthesized with a Constrained Geometry Catalyst," Macromolecules, 2000, vol. 33, pp. 1157-1162, American Chemical Society.
Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.
Zweifel, H., et al., "Solubility of Additives in Polymers," Plastics Additives Handbook, 6th Edition, 2009, pp. 1141-1190, Hanser Publishers, Munich.
Zweifel, H., "The Use of Nucleating Agents in teh Melt-processing of Semi-crystalline Polymers," Plastics Additives Handbook, 5th Edition, 2001, pp. 956-965, Hanser Publishers, Munich.
Notification of Transmittal of the International Search Report and the Written Opinion of the International Searching Authority, or the Declaration for Application No. PCT/EP2016/069113, dated Oct. 4, 2016, 10 pgs.

\* cited by examiner

COMPOSITE COMPRISING A CELLULOSE-BASED FILLER

CROSS-REFERENCE TO RELATED APPLICATION(S)

This application is a national phase of International Application No. PCT/EP2016/069113, filed on Aug. 11, 2016, which claims the benefit of European Patent Application No. 15181060.3, filed on Aug. 14, 2015. The contents of these applications are hereby incorporated by reference in their entirety.

The present invention relates to new composite comprising cellulose-based filler as well as to molded articles made from said composite.

Reinforced composites are well known and quite often applied in the automobile industry. Nowadays the customers prefer composites which contain reinforcing material coming from renewable sources. One advantage of such material is that the density of the final material is reduced, which leads to reduced weight of the final construction element. Such reinforcing material cannot simply replace common fiber material, like glass fibers, used in reinforced composites. In other words any knowledge coming from common reinforced composites, i.e. composites containing for instance glass fibers, cannot be used in the area of composites based on renewable sources.

In the present case composites are sought for which are lightweight, easy to process, stiff and have good impact.

The finding of the present invention is to provide a composite comprising a heterophasic propylene copolymer (HECO), a polyethylene (PE) having a density in the range of 935 to 970 kg/m$^3$, and a cellulose-based filler (CF), wherein the amount of polyethylene (PE) in the composite is in the range of 5 to 40 wt.-%, based on the total weight of the composite, and the amount of the cellulose-based filler (CF) in the composite is in the range of 5 to 30 wt.-%, based on the total weight of the composite.

Accordingly the present invention is directed to a composite comprising (a) 32 to 89 wt.-%, based on the total weight of the composite, of a heterophasic propylene copolymer (HECO) comprising a polypropylene (PP) as a matrix in which an elastomeric propylene copolymer (EC) is dispersed;

(b) 5.0 to 40 wt.-%, based on the total weight of the composite, of a polyethylene (PE) having a density in the range of 935 to 970 kg/m$^3$;

(c) 5.0 to 30 wt.-%, based on the total weight of the composite, of cellulose-based filler (CF); and (d) 1.0 to 8.0 wt.-%, based on the total weight of the composite, of an adhesion promoter (AP).

Preferably the heterophasic propylene copolymer (HECO) is the only heterophasic propylene copolymer in the composite. Additionally it is preferred that the composite does not contain a further (semicrystalline) polypropylene different to the (semicrystalline) polypropylene (PP) of the matrix.

Accordingly the present invention is especially directed to a composite comprising (a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;

(b) 5.0 to 40 wt.-%, based on the total weight of the composite, of a high density polyethylene (HDPE) having a density in the range of 935 to 970 kg/m$^3$;

(c) 5.0 to 30 wt.-%, based on the total weight of the composite, of cellulose-based filler (CF);

(d) 1.0 to 8.0 wt.-%, based on the total weight of the composite, of an adhesion promoter (AP), and (e) optionally, alpha nucleating agents (NU) and/or additives (A).

Thus the present invention is especially directed to a composite consisting of (a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;

(b) 5.0 to 40 wt.-%, based on the total weight of the composite, of a high density polyethylene (HDPE) having a density in the range of 935 to 970 kg/m$^3$;

(c) 5.0 to 30 wt.-%, based on the total weight of the composite, of cellulose-based filler (CF);

(d) 1.0 to 8.0 wt.-%, based on the total weight of the composite, of an adhesion promoter (AP), (e) optionally up to 5 wt.-%, based on the total weight of the composite, of alpha nucleating agents (NU) and (f) optionally up to 8.0 wt.-%, based on the total weight of the composite, of additives (A).

Preferably the heterophasic propylene copolymer (HECO) has a melt flow rate MFR$_2$ (230° C., 2.16 kg) in the range of from 3.0 to 30.0 g/10 min and/or a comonomer content of <30.0 mol.-%, based on the heterophasic propylene copolymer (HECO).

Alternatively or additionally to the previous paragraph the heterophasic propylene copolymer (HECO) has a xylene cold soluble (XCS) fraction (25° C.) of from 15.0 to 50.0 wt.-%, based on the total weight of the heterophasic propylene copolymer (HECO).

It is further preferred that the amorphous fraction (AM) of the heterophasic propylene copolymer (HECO) has (a) a comonomer content in the range of 30.0 to 60.0 mol.-%, based on the amorphous fraction (AM) of the heterophasic propylene copolymer (HECO) and/or (b) an intrinsic viscosity (IV) in the range of 1.8 to 3.2 dl/g.

Additionally it is preferred that the polyethylene (PE) is a high density polyethylene (HDPE) preferably having a melt flow rate MFR$_2$ (190° C., 2.16 kg) in the range of from 0.1 to 30.0 g/10 min.

Preferably the cellulose-based filler (CF) is selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxymethyl cellulose (CMC), and any mixtures thereof.

Alternatively or additionally to the previous paragraph the cellulose-based filler (CF) has preferably a volume moment mean (D[4.3]) diameter 1 and 300 μm.

Preferably the adhesion promotor (AP) is selected from the group consisting of an acid modified polyolefin, an anhydride modified polyolefin and a modified styrene block copolymer. More preferably the adhesion promoter (AP) is a maleic anhydride functionalized polypropylene.

Preferably the nucleating agents (NU) are selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Preferably the additives (A) are selected from the group consisting of acid scavengers, antioxidants, colorants, light stabilisers, plasticizers, slip agents, anti-scratch agents, dispersing agents, processing aids, lubricants, pigments, and mixtures thereof.

The present invention is also directed to a molded article comprising a composite as defined in the present invention. The molded article is preferably an automotive article.

The invention is now defined in more detail.

The Composite

As mentioned above the composite must comprise a heterophasic propylene copolymer (HECO), a polyethylene (PE), a cellulose-based filler (CF), and a compatibilizer (C). In addition the composite may comprise alpha nucleating agents (NU) and additives (A). Accordingly it is preferred that the heterophasic propylene copolymer (HECO), the polyethylene (PE), the cellulose-based filler (CF), and the adhesion promoter (AP) make up together at least 80 wt.-%, more preferably at least 85 wt.-%, yet more preferably at least 90 wt.-%, like at least 95 wt.-%, based on the total weight of the composite, of the composite.

Accordingly in one specific embodiment the composite consists of the heterophasic propylene copolymer (HECO), the polyethylene (PE), the cellulose-based filler (CF), the adhesion promoter (AP) and the optional alpha nucleating agents (NU) and/or additives (A).

In one preferred embodiment the weight ratio of the polyethylene (PE) and the cellulose-based filler (CF) [(PE)/(CF)] is in the range of 0.5 to 1.5, more preferably in the range 0.75 to 1.25, yet more preferably in the range of 0.9 to 1.1.

Alternatively or additionally to the previous paragraph it is preferred that the weight ratio of the heterophasic propylene copolymer (HECO) and the polyethylene (PE) [(HECO)/(PE)] is in the range of 1.6 to 7.0, more preferably in the range 2.2 to 4.3, yet more preferably in the range of 2.5 to 3.8, like in the range of 2.8 to 3.3.

Further it is preferred that the weight ratio of the cellulose-based filler (CF) and the adhesion promoter (AP) [(CF)/(AP)] is in the range of 2.5 to 20, more preferably in the range 4.0 to 15, yet more preferably in the range of 6.0 to 12.0.

It is especially preferred that the composite comprises (a) 32 to 89 wt.-%, more preferably 40 to 80 wt.-%, still more preferably 50 to 70 wt.-%, yet more preferably 55 to 65 wt.-%, based on the total weight of the composite, of a heterophasic propylene copolymer (HECO) comprising a polypropylene (PP) as a matrix in which an elastomeric propylene copolymer (EC) is dispersed;

(b) 5.0 to 40 wt.-%, more preferably 10 to 30 wt.-%, still more preferably 15 to 25 wt.-%, based on the total weight of the composite, of a polyethylene (PE) having a density in the range of 935 to 970 kg/m$^3$;

(c) 5.0 to 30 wt.-%, more preferably 10 to 28 wt.-%, still more preferably 15 to 25 wt.-%, based on the total weight of the composite, of cellulose-based filler (CF); and (d) 1.0 to 8.0 wt.-%, more preferably 1.5 to 6.0 wt.-%, still more preferably 1.8 to 5.0 wt.-%, based on the total weight of the composite, of an adhesion promoter (AP).

The composite may comprise in addition alpha-nucleating agents (NU) and/or additives (A). According to this invention the alpha nucleating agent (NU) is not an additive (A). Accordingly it is preferred that the composite contains up to 5.0 wt.-%, preferably $1.0 \times 10^{-5}$ to 4.0 wt.-%, more preferably $2.0 \times 10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (A).

Therefore it is especially preferred that the composite consists of (a) 32 to 89 wt.-%, more preferably 40 to 80 wt.-%, still more preferably 50 to 70 wt.-%, yet more preferably 55 to 65 wt.-%, based on the total weight of the composite, of a heterophasic propylene copolymer (HECO) comprising a polypropylene (PP) as a matrix in which an elastomeric propylene copolymer (EC) is dispersed;

(b) 5.0 to 40 wt.-%, more preferably 10 to 30 wt.-%, still more preferably 15 to 25 wt.-%, yet more preferably 18 to 22 wt.-%, based on the total weight of the composite, of a polyethylene (PE) having a density in the range of 935 to 970 kg/m$^3$;

(c) 5.0 to 30 wt.-%, more preferably 10 to 28 wt.-%, still more preferably 15 to 25 wt.-%, based on the total weight of the composite, of cellulose-based filler (CF);

(d) 1.0 to 8.0 wt.-%, more preferably 1.5 to 6.0 wt.-%, still more preferably 2.0 to 5.0 wt.-%, based on the total weight of the composite, of an adhesion promoter (AP);

(e) optionally up to 5.0 wt.-%, preferably $1.0 \times 10^{-5}$ to 4.0 wt.-%, more preferably $2.0 \times 10^5$ to 2.0 wt.-%, based on the total weight of the composite, of alpha nucleating agents (NU); and (f) optionally up to 8.0 wt.-%, preferably 0.1 to 6.0 wt.-%, more preferably 0.5 to 4.0 wt.-%, based on the total weight of the composite, of additives (A).

Preferably the composite has a density in the range of 900 to 1100 kg/cm$^3$, more preferably in the range of 925 to 1080 kg/m$^3$, yet more preferably in the range of 930 to 1070 kg/cm$^3$.

It is especially preferred that the composite has a melt flow rate MFR$_2$ (230° C., 2.16 kg) in the range of 0.5 to 20.0 g/10 min, more preferably in the range of 0.8 to 17.0 g/10 min, still more preferably in the range of 1.0 to 15.0 g/10 min, like in the range of 1.2 to 14.0 g/10 min.

Preferably the composite has a flexural modulus of at least 1,200 MPa, more preferably in the range of 1,200 to 1,600 MPa, yet more preferably in the range of 1,250 to 1,550 MPa. Additionally or alternatively to the previous paragraph the composite has a Charpy notched impact strength (23° C.) of at least 8.5 kJ/m$^2$, more preferably in the range of 9.0 to 25.0 kJ/m$^2$, like in the range of 9.2 to 20.0 kJ/m$^2$.

In the following the individual components of the composite are defined in more detail.

The Heterophasic Propylene Copolymer (HECO)

The composite according to this invention must contain a heterophasic propylene copolymer (HECO) comprising a polypropylene (PP) as a matrix in which an elastomeric propylene copolymer (EC) is dispersed. The expression "heterophasic propylene copolymer" or "heterophasic" as used in the instant invention indicates that the elastomeric propylene copolymer (EC) is (finely) dispersed in the (semicrystalline) polypropylene (PP). In other words the (semicrystalline) polypropylene (PP) constitutes a matrix in which the elastomeric propylene copolymer (EC) forms inclusions in the matrix, i.e. in the (semicrystalline) polypropylene (PP). Thus the matrix contains (finely) dispersed inclusions being not part of the matrix and said inclusions contain the elastomeric propylene copolymer (EC). The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic propylene copolymer (HECO) has a melt flow rate $MFR_2$ (230° C., 2.16 kg) in the range of 3.0 to 30.0 g/10 min, more preferably in the range of 5.0 to 25.0 g/10 min, still more preferably in the range of 6.0 to 25.0 g/10 min, like in the range of 7.0 to 20.0 g/10 min.

As mentioned above, the heterophasic propylene copolymer (HECO) according to this invention preferably comprises
(a) a (semicrystalline) polypropylene (PP) as the matrix (M) and
(b) an elastomeric propylene copolymer (EC).

Preferably the heterophasic propylene copolymer (HECO) has a comonomer content, preferably a content of ethylene and/or $C_4$ to $C_{12}$ α-olefin, more preferably an ethylene content, of equal or below 30.0 mol.-%, more preferably in the range of 10.0 to 30.0 mol.-%, still more preferably in the range of 12.0 to 25.0 mol.-%, yet more preferably in the range of 14.0 to 22.0 mol.-%, based on the heterophasic propylene copolymer (HECO).

Preferably the heterophasic propylene copolymer (HECO) has a xylene cold soluble (XCS) fraction (25° C.) in the range of 15.0 to 50.0 wt.-%, more preferably in the range of 22.0 to 50.0 wt.-%, still more preferably in the range of 25.0 to 45.0 wt.-% and most preferably in the range of 26.0 to 38.0 wt. %.

Preferably the comonomer content, preferably the content of ethylene and/or $C_4$ to $C_{12}$ α-olefin, more preferably the content of ethylene, of the xylene cold soluble fraction (XCS) of the heterophasic propylene copolymer (HECO) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the xylene cold soluble fraction (XCS) of the heterophasic propylene copolymer (HECO).

In a preferred embodiment the intrinsic viscosity (IV) of the amorphous fraction (AM) of the heterophasic propylene copolymer (HECO) is rather high. Rather high values of intrinsic viscosity (IV) improve the impact strength. Accordingly it is especially preferred that the intrinsic viscosity of the amorphous fraction (AM) of the heterophasic propylene copolymer (HECO) is above 1.8 dl/g, more preferably at least 2.0 dl/g. On the other hand the intrinsic viscosity (IV) should be not too high otherwise the flowability is decreased. Thus the intrinsic viscosity of the amorphous fraction (AM) of the heterophasic propylene copolymer (HECO) is preferably in the range of 1.8 to 4.0 dl/g, more preferably in the range 2.0 to 3.6 dl/g and even more preferably in the range of 2.0 to 3.2 dl/g.

The (semicrystalline) polypropylene (PP) is preferably a (semicrystalline) random propylene copolymer (R-PP) or a (semicrystalline) propylene homopolymer (H-PP), the latter especially preferred.

The expression "propylene homopolymer" used in the instant invention relates to a polypropylene that consists substantially, i.e. of more than 99.55 mol-%, still more preferably of at least 99.70 mol-%, of propylene units. In a preferred embodiment only propylene units in the propylene homopolymer are detectable.

In case the (semicrystalline) polypropylene (PP) is a (semicrystalline) random propylene copolymer (R-PP) it is appreciated that the (semicrystalline) random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semicrystalline) random propylene copolymer (R-PP) according to this invention comprises, especially consists of, monomers co-polymerizable with propylene from the group consisting of ethylene, 1-butene and 1-hexene. More specifically the (semicrystalline) random propylene copolymer (R-PP) of this invention comprises—apart from propylene—units derivable from ethylene and/or 1-butene. In a preferred embodiment the (semicrystalline) random propylene copolymer (R-PP) comprises units derivable from ethylene and propylene only.

Additionally it is appreciated that the (semicrystalline) random propylene copolymer (R-PP) has preferably a co-monomer content in the range of more than 0.4 to 1.5 mol-%, more preferably in the range of more than 0.3 to 1.2 mol-%, yet more preferably in the range of 0.4 to 1.0 mol-%.

The term "random" indicates that the co-monomers of the (semicrystalline) random propylene copolymers (R-PP) are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. Typically the (semicrystalline) polypropylene (PP) is produced in at least one first reactor and subsequently the elastomeric propylene copolymer (EC) in at least one second reactor.

Further it is appreciated that the (semicrystalline) polypropylene (PP), like (semicrystalline) propylene homopolymer (H-PP), of the heterophasic propylene copolymer (HECO) has a moderate melt flow $MFR_2$ (230° C.). Thus it is preferred that the (semicrystalline) polypropylene (PP), like (semicrystalline) propylene homopolymer (H-PP), of the heterophasic propylene copolymer (HECO) has a melt flow rate $MFR_2$ (230° C.) measured according to ISO 1133 of 30.0 to 150.0 g/10 min, more preferably of 35.0 to 110 g/10 min, still more preferably of 40.0 to 100 g/10 min, still more preferably of 45.0 to 90 g/10 min.

The term "semicrystalline" indicates that the polymer is not amorphous. Accordingly it is preferred that the semicrystalline polypropylene (PP) according to this invention has a xylene soluble fraction (XCS) of not more than 10 wt.-%, in case of a (semicrystalline) propylene homopolymer (H-PP) the xylene soluble fraction (XCS) is even lower, i.e. not more than 6.0 wt.

Accordingly it is preferred that the (semicrystalline) propylene homopolymer (H-PP) has a xylene soluble fraction (XCS) of below 5.0 wt.-%, more preferably in the range of 0.5 to 4.5, like in the range of 1.0 to 3.5 wt.-%.

Preferably the (semicrystalline) polypropylene (PP) according to this invention has a melting temperature Tm above 135° C., more preferably above 140° C. In case of the (semicrystalline) propylene homopolymer (H-PP) the melting temperature Tm is above 150° C., like at least 156° C. Upper ranges are not more than 168° C., like not more than 166° C.

The second component of the heterophasic propylene copolymer (HECO) is the elastomeric propylene copolymer (EC).

Preferably said elastomeric propylene copolymer (EC) comprises units derived from
propylene and
ethylene and/or $C_4$ to $C_{12}$ α-olefin.

The elastomeric propylene copolymer (EC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (EC) may additionally contain units derived from a conjugated diene, like butadiene, or a non-conjugated diene, however it is preferred that the elastomeric propylene copolymer (EC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly the elastomeric propylene copolymer (EC) comprises at least units derivable from propylene and ethylene and may comprise other units derivable from a further α-olefin as defined in the previous paragraph. However, it is in particular preferred that elastomeric propylene copolymer (EC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (EC) is especially preferred, the latter most preferred.

In the present invention the content of units derivable from propylene in the elastomeric propylene copolymer (EP) equates largely with the content of propylene detectable in the xylene cold soluble (XCS) fraction. Accordingly the comonomer content, like the ethylene content, of the elastomeric propylene copolymer (EC) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the elastomeric propylene copolymer (EC).

As mentioned above the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semicrystalline) polypropylene (PP) is produced at least in one slurry reactor, preferably in a slurry reactor and optionally in a subsequent gas phase reactor, and subsequently the elastomeric propylene copolymer (EC) is produced at least in one, i.e. one or two, gas phase reactor(s).

Accordingly it is preferred that the heterophasic propylene copolymer (HECO) is produced in a sequential polymerization process comprising the steps of (a) polymerizing propylene and optionally at least one ethylene and/or $C_4$ to $C_{12}$ α-olefin in a first reactor (R1) obtaining the first polypropylene fraction of the (semicrystalline) polypropylene (PP), preferably said first polypropylene fraction is a propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semicrystalline) polypropylene (PP), i.e. the matrix of the heterophasic propylene copolymer (HECO), (d) transferring the (semicrystalline) polypropylene (PP) of step (c) into a third reactor (R3), (e) polymerizing in the third reactor (R3) and in the presence of the (semicrystalline) polypropylene (PP) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the (semicrystalline) polypropylene (PP), (f) transferring the (semicrystalline) polypropylene (PP) in which the first elastomeric propylene copolymer fraction is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the first and the second elastomeric propylene copolymer fraction form together the elastomeric propylene copolymer (EC);

the (semicrystalline) polypropylene (PP) and the elastomeric propylene copolymer (EC) form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least four, preferably four polymerization reactors, namely two slurry reactors (SR), like two loop reactors (LR), first gas phase reactor (GPR-1) and a second gas phase reactor (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
 the temperature is within the range of 50° C. to 110° C., preferably between 60° C. and 100° C., more preferably between 68 and 95° C.,
 the pressure is within the range of 20 bar to 80 bar, preferably between 40 bar to 70 bar,
 hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst may be a "non-phthalic" Ziegler-Natta procatalyst or a "phthalic" Ziegler-Natta procatalyst. First the "non-phthalic" Ziegler-Natta procatalyst is described, subsequently the phthalic" Ziegler-Natta procatalyst The "non-phthalic" Ziegler-Natta procatalyst comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the "non-phthalic" Ziegler-Natta procatalyst is fully free of undesired phthalic compounds. Further, the "non-phthalic" Ziegler-Natta procatalyst is free of any external support material, like silica or $MgCl_2$, but the catalyst is self-supported.

The "non-phthalic" Ziegler-Natta procatalyst can be further defined by the way as obtained. Accordingly the "non-phthalic" Ziegler-Natta procatalyst is preferably obtained by a process comprising the steps of
a)
- $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or
- $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or
- $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the "non-phthalic" Ziegler-Natta procatalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active "non-phthalic" Ziegler-Natta procatalyst composition. Solidification (step c) of the droplets is suitably carried out by heating the emulsion to a temperature of 70 to 150° C., preferably to 80 to 110° C.

The "non-phthalic" Ziegler-Natta procatalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained "non-phthalic" Ziegler-Natta procatalyst is desirably in the form of particles having generally an average particle size range of 5 to 200 µm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The "phthalic" Ziegler-Natta procatalyst is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

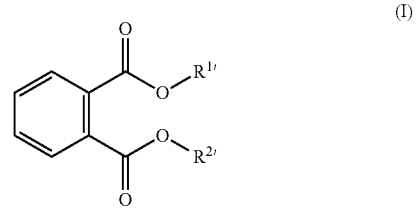

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The "phthalic" Ziegler-Natta procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

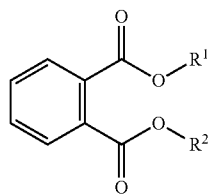

with R¹ and R² being methyl or ethyl, preferably ethyl, the dialkylphthalat of formula (II) being the internal donor and recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the "phthalic" Ziegler-Natta procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the "phthalic" Ziegler-Natta procatalyst used according to the invention has been produced by using ethanol as the alcohol and dioctylphthalate (DOP) as dialkylphthalate of formula (I), yielding diethyl phthalate (DEP) as the internal donor compound.

Still more preferably the "phthalic" Ziegler-Natta procatalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst ("non-phthalic" or "phthalic") an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor is of formula (IIIa), like dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$].

Most preferably the external donor is dicyclopentyl dimethoxy silane [Si(OCH$_3$)$_2$(cyclo-pentyl)$_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein R$^3$ and R$^4$ together form a 5- or 6-membered saturated, unsaturated or aromatic ring or independently represent an alkyl group comprising 1 to 4 carbon atoms, and the modified catalyst is used for the preparation of the heterophasic propylene copolymer [HECO] according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polyethylene (PE)

The polyethylene (PE) according to this invention has a density in the range of 935 to 970 kg/m$^3$; more preferably in the range of 950 to 970 kg/cm$^3$, still more preferably in the range of 955 to 968 kg/cm$^3$. Accordingly in one preferred embodiment the polyethylene is a high density polyethylene (HDPE).

Preferably the polyethylene (PE), like the high density polyethylene (HDPE), has a melt flow rate MFR$_2$ (190° C., 2.16 kg) in the range of 0.1 to 30 g/10 min, more preferably in the range of 0.1 to 15 g/10 min, yet more preferably in the range of 0.4 to 10.0 g/10 min.

The high density polyethylene (HDPE) according to this invention is known in the art and for instance available as BS4641 from Borealis AG.

The Cellulose-Based Filler (CF)

The composite of the present invention must comprise cellulose-based filler (CF). The cellulose-based filler (CF) can be reinforcing (high aspect ratio) filler or non-reinforcing (low aspect ratio). Aspect ratio is defined as the ratio of the length to the effective diameter of the filler particle. Preferably the cellulose-based filler (CF) has an aspect ratio in the range of 2.0 to 13.0, more preferably in the range of 2.5 to 7.0, yet more preferably in the range of 3.0 to 5.0.

Preferably the cellulose-based filler (CF) has a volume moment mean (D[4.3]) diameter between 1 and 300 µm, more preferably between 40 to 250 µm, yet more preferably between 100 to 200 µm.

The cellulose may be derived from any source, including wood/forest and agricultural by-products. Accordingly the cellulose-based filler (CF) is preferably selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxymethyl cellulose (CMC), and any mixtures thereof. The cellulose-based filler (CF) is in particular selected from the group consisting wood flour, paper, pulp, raw cellulose and cellulose. Most preferably the cellulose-based filler (CF) is wood flour.

The Adhesion Promoter (AP)

To improve compatibility between on the one hand the polymer components, e.g. the heterophasic propylene copolymer (HECO) and the polyethylene (PE), and on the other hand the cellulose-based filler (CF) an adhesion promoter (AP) is used.

The adhesion promoter (AP) preferably comprises, more preferably is, a modified (functionalized) polymer and optionally a low molecular weight compound having reactive polar groups.

Modified alpha-olefin polymers, in particular propylene homopolymers and copolymers, like copolymers of ethylene and propylene with each other or with other alpha-olefins, are most preferred, as they are highly compatible with the polymers of the polyolefin composition. Modified polyethylene and modified styrene block copolymers, like modified poly(styrene-b-butadiene-b-styrene) (SBS) or poly(styrene-b-(ethylene-cobutylene)-b-styrene) (SEBS), can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to maleic anhydride functionalized polypropylene as adhesion promoter (AP).

The amounts of groups deriving from polar groups, e.g. maleic anhydride, in the modified polymer, like the modified polypropylene, are preferably from 0.1 to 3.0 wt.-%, more preferably from 0.3 to 2.5 wt.-%, and most preferably from 0.4 to 2.0 wt.-%, such as from 0.5 to 1.6 wt.-%, based on the total weight of the polar modified polymer.

Particular preference is given to a adhesion promoter (AP) being a modified propylene copolymer or, a modified propylene homopolymer the latter is especially preferred.

In one embodiment the adhesion promoter (AP) is a modified (random) propylene copolymer containing polar groups as defined above. In one specific embodiment the adhesion promoter (AP) is a (random) propylene copolymer grafted with maleic anhydride. Thus in one specific preferred embodiment the adhesion promoter (AP) is a (random) propylene ethylene copolymer grafted with maleic anhydride, more preferably wherein the ethylene content based on the total amount of the random propylene ethylene copolymer is in the range of 1.0 to 8.0 mol-%, more preferably in the range of 1.5 to 7.0 mol-%.

Required amounts of groups deriving from polar groups in the polar modified (random) propylene copolymer or in the modified propylene homopolymer are preferably 0.1 to 3.0 wt.-%, more preferably from 0.3 to 2.5 wt.-%, and most preferably from 0.4 to 2.0 wt.-%, such as from 0.5 to 1.6 wt.-%, based on the total weight of the polar modified (random) propylene copolymer.

The modified polymer, i.e. the adhesion promoter (AP), can be produced in a simple manner by reactive extrusion of the polymer, for example with maleic anhydride in the presence of free radical generators (like organic peroxides), as disclosed for instance in EP 0 572 028.

Preferably the melt flow rate $MFR_2$ (230° C., 2.16 kg) of the adhesion promoter (AP), like the modified polymer, e. g. for the maleic anhydride modified polypropylene, like the maleic anhydride modified (random) propylene ethylene copolymer, is in the range of 0.5 to 200 g/10 min, more preferably in the range of 1.0 to 100 g/10 min, yet more preferably in the range of 1.0 to 20 g/10 min.

The Alpha Nucleating Agent (NU)

According to this invention the alpha nucleating agent (NU) does not belong to the class of additive (A) as defined below.

The composite may contain an alpha nucleating agent (NU). Even more preferred the present invention is free of beta nucleating agents. Accordingly, the alpha nucleating agent (NU) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Preferably the composite contains as alpha nucleating agent a vinylcycloalkane polymer and/or a vinylalkane polymer. This alpha nucleating agent (NU) is included as described above, namely due to the preparation of the heterophasic propylene copolymer (HECO).

Such additives and nucleating agents are generally commercially available and are described, for example, in "Plastic Additives Handbook", 5th edition, 2001 of Hans Zweifel.

The Additives (A)

The composite of the present invention may comprise additives (A). Typical additives are acid scavengers, antioxidants, colorants, light stabilisers, plasticizers, slip agents, anti-scratch agents, dispersing agents, processing aids, lubricants, and pigments.

Such additives are commercially available and for example described in "Plastic Additives Handbook", 6$^{th}$ edition 2009 of Hans Zweifel (pages 1141 to 1190).

Furthermore, the term "additives" according to the present invention also includes carrier materials, in particular polymeric carrier materials (PCM), as defined below.

The Polymeric Carrier Material (PCM)

Preferably the polypropylene composition (PC) does not comprise (a) further polymer (s) different to the polymer(s) comprised in the polymers polypropylene composition (PC), i.e. the first polypropylene homopolymer (HPP-1), optionally the second polypropylene homopolymer (HPP-2) and the polar modified polypropylene (PMP) in an amount exceeding 10 wt.-%, preferably exceeding 5 wt.-%, based on the weight of the polypropylene composition (PC). If an additional polymer is present, such a polymer is typically a polymeric carrier material (PCM) for the additives (A).

It is appreciated that the composite comprises polymeric carrier material (PCM) in an amount of not more than 10.0 wt.-%, preferably in an amount of not more than 5.0 wt.-%, more preferably in an amount of not more than 2.5 wt.-%, like in the range of 1.0 to 10.0 wt.-%, preferably in the range of 1.0 to 5.0 wt.-%, even more preferably in the range of 1.0 to 2.5 wt.-%, based on the total weight of the composite.

The polymeric carrier material (PCM) is a carrier polymer for the additives (A) to ensure a uniform distribution in the composite. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

According to a preferred embodiment the polymeric carrier material (PCM) is a polypropylene homopolymer, this propylene homopolymer.

The Process

The composite according to the invention may be pelletized and compounded using any of the variety of compounding and blending methods well known and commonly used in the resin compounding art.

The Article/the Use

The composite of the present invention is preferably used for the production of molded articles, preferably injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, like injection molded articles, comprising, preferably comprising at least 60 wt.-%, more preferably at least 80 wt.-%, yet more preferably at least 95 wt.-%, like consisting of, the inventive composite. Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composite.

Taking the above information in mind the following embodiments are especially preferred:

[1] Composite comprising
(a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;
(b) 5.0 to 40 wt.-%, based on the total weight of the composite, of a polyethylene (PE) having a density in the range of 935 to 970 kg/m$^3$;
(c) 5.0 to 30 wt.-%, based on the total weight of the composite, of cellulose-based filler (CF); and
(d) 1.0 to 8.0 wt.-%, based on the total weight of the composite, of an adhesion promoter (AP).

[2] Composite according to paragraph [1], wherein the heterophasic propylene copolymer (HECO) has a melt flow rate MFR$_2$ (230° C., 2.16 kg) in the range of from 3.0 to 30.0 g/10 min.

[3] Composite according to paragraph [1] or [2], wherein the heterophasic propylene copolymer (HECO) has a xylene cold soluble (XCS) fraction (25° C.) of from 15.0 to 50.0 wt.-%, based on the total weight of the heterophasic propylene copolymer (HECO).

[4] Composite according to any one of the paragraphs [1] to [3], wherein the heterophasic propylene copolymer (HECO) has a comonomer content of <30.0 mol.-%, based on the heterophasic propylene copolymer (HECO).

[5] Composite according to any one of the paragraphs [1] to [4], wherein the (semicrystalline) polypropylene (PP) is a (semicrystalline) propylene homopolymer (H-PP) and/or the elastomeric propylene copolymer (EC) is an ethylene propylene rubber (EPR).

[6] Composite according to any one of the paragraphs [1] to [5], wherein the amorphous fraction (AM) of the heterophasic propylene copolymer (HECO) has a comonomer content in the range of 30.0 to 60.0 mol.-%, based on the amorphous fraction (AM) of the heterophasic propylene copolymer (HECO).

[7] Composite according to any one of the paragraphs [1] to [6], wherein the amorphous fraction (AM) of the heterophasic propylene copolymer (HECO) has an intrinsic viscosity (IV) in the range of 1.8 to 3.2 dl/g.

[8] Composite according to any one of the paragraphs [1] to [7], wherein the polyethylene (PE) is a high density polyethylene (HDPE) preferably having a melt flow rate MFR$_2$ (190° C., 2.16 kg) in the range of from 0.1 to 30.0 g/10 min.

[9] Composite according to any one of the paragraphs [1] to [8], wherein the cellulose-based filler (CF) is selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxymethyl cellulose (CMC), and any mixtures thereof.

[10] Composite according to any one of the paragraphs [1] to [9], wherein the cellulose-based filler (CF) has a volume moment mean (D[4.3]) diameter between 1 and 300 μm.

[11] Composite according to any one of the paragraphs [1] to [10], wherein the adhesion promoter (AP) is selected from the group consisting of an acid modified polyolefin, an anhydride modified polyolefin and a modified styrene block copolymer.

[12] Composite according to any one of the paragraphs [1] to [11], wherein the adhesion promoter (AP) is a maleic anhydride functionalized polypropylene.

[13] Molded article comprising a composite according to any one of the paragraphs [1] to [12].

[14] Molded article according to paragraph [13] being an automotive article.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ $\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d2 (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C$ $\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ $\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

DSC Analysis, Melting Temperature ($T_m$) and Heat of Fusion ($H_f$), Crystallization Temperature ($T_c$) and Heat of Crystallization ($H_c$):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

Density is measured according to ISO 1183-1-method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

The Xylene Cold Solubles (XCS, Wt.-%):

Content of xylene cold solubles (XCS) is determined at 25° C. according to ISO 16152; first edition; 2005-07-01 The amorphous content (AM) is measured by separating the above xylene cold soluble fraction (XCS) and precipitating the amorphous part with acetone. The precipitate was filtered and dried in a vacuum oven at 90° C.

$$AM\% = \frac{100*m1*v0}{m0*v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Flexural Modulus is determined in 3-point-bending according to ISO 178 on injection molded specimens of 80×10×4 mm³ prepared in accordance with EN ISO 1873-2.

Charpy notched impact strength is determined according to ISO 179/1 eA at 23° C. by using injection moulded test specimens of 80×10×4 mm³ prepared in accordance with EN ISO 1873-2.

The particle size and particle size distribution of the cellulose-based fillers (CF), like wood flour fillers were determined by a Horiba Partica LA 950 V2 (Horiba Co., Japan) laser diffraction particle size analyzer equipped with an automated dry powder dispersion unit. Three parallel measurements were carried out and the result given is their average. The volume moment mean (D[4.3]) was calculated and used as mean particle size of cellulose-based fillers (CF), like the wood flour fillers.

The aspect ratio of the cellulose-based fillers (CF), like wood flour fillers was determined with the help of scanning electron microscopy (SEM). The SEM micrographs were taken by a Jeol JSM 6380 LA apparatus. The particles on the SEM micrographs were measured with the help of image analysis software (Image Pro Plus) and the length and diameter of the particles were measured individually by hand. At least 500 particles were analyzed on several micrographs in order to lower the standard deviation of the evaluation and aspect ratio was calculated thereof.

2. Examples

Preparation of HECO
Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491566, EP 591224 and EP 586390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt %) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 1

Polymerization of HECO

|  |  | HECO |
|---|---|---|
| Prepoly |  |  |
| Residence time | [h] | 0.08 |
| Temperature | [° C.] | 30 |
| Co/ED ratio | [mol/mol] | 7.3 |
| Co/TC ratio | [mol/mol] | 220 |
| Loop (R1) |  |  |
| Residence time | [h] | 0.6 |
| Temperature | [° C.] | 75 |
| $H_2/C_3$ ratio | [mol/kmol] | 14.8 |
| $MFR_2$ | [g/10 min] | 55 |
| XCS | [wt %] | 2.0 |
| C2 content | [wt %] | 0 |
| split | [wt %] | 30 |
| 1$^{st}$ GPR (R2) |  |  |
| Residence time | [h] | 0.75 |
| Temperature | [° C.] | 80 |
| Pressure | [kPa] | 2200 |
| $H_2/C_3$ ratio | [mol/kmol] | 149.7 |
| $MFR_2$ | [g/10 min] | 55 |
| XCS | [wt %] | 2.0 |
| C2 content | [wt %] | 0 |
| split | [wt %] | 35 |
| 2$^{nd}$ GPR (R3) |  |  |
| Residence time | [h] | 0.6 |
| Temperature | [° C.] | 70 |
| Pressure | [kPa] | 2190 |
| $C_2/C_3$ ratio | [mol/kmol] | 584.6 |
| $H_2/C_2$ ratio | [mol/kmol] | 116.5 |
| $MFR_2$ | [g/10 min] | 11 |
| C2 content | [wt %] | 8.5 |
| split | [wt %] | 20 |
| 3$^{rd}$ GPR (R4) |  |  |
| Residence time | [h] | 0.6 |
| Temperature | [° C.] | 85 |
| Pressure | [kPa] | 1320 |
| $C_2/C_3$ ratio | [mol/kmol] | 585.2 |
| $H_2/C_2$ ratio | [mol/kmol] | 92.7 |
| $MFR_2$ | [g/10 min] | 11 |
| C2 content | [wt %] | 13 |
| split | [wt %] | 15 |

The properties of the products obtained from the individual reactors naturally are not measured on homogenized material but on reactor samples (spot samples). The properties of the final resin are measured on homogenized material, the $MFR_2$ on pellets made thereof in an extrusion mixing process as described below.

The HECO was mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additives.

TABLE 2

Properties of HECO

| HECO | | |
|---|---|---|
| H-PP (1$^{st}$ and 2$^{nd}$ reactor) | [wt %] | 65 |
| MFR$_2$ of H-PP (1$^{st}$ and 2$^{nd}$ reactor) | [g/10 min] | 55 |
| Tm of H-PP (1$^{st}$ and 2$^{nd}$ reactor) | [° C.] | 165 |
| EPR (3$^{rd}$ and 4$^{th}$ reactor) | [wt %] | 35 |
| C2 of EPR (3$^{rd}$ and 4$^{th}$ reactor) | [mol %] | 47 |
| C2 of AM | [mol %] | 47.9 |
| IV of AM | [dl/g] | 2.5 |
| XCS (final) | [wt %] | 32 |
| C2 (total) | [mol %] | 18.3 |
| MFR$_2$ (230° C.) (final) | [g/10 min] | 11 |

AM amorphous fraction
C2 ethylene content
MFR$_2$ is MFR$_2$ (230° C.; 2.16 kg)

TABLE 3a

Inventive Examples

| | | Example | | | |
|---|---|---|---|---|---|
| | | IE1 | IE2 | IE1 | IE2 |
| HECO | [wt %] | 68 | 63 | 53 | 48 |
| HDPE | [wt %] | 10 | 15 | 25 | 30 |
| CF | [wt %] | 20 | 20 | 20 | 20 |
| AP | [wt %] | 2 | 2 | 2 | 2 |
| MFR$_2$ (230° C.) | [g/10 min] | 5.7 | 5.0 | 4.3 | 4.0 |
| FM | [MPa] | 1330 | 1350 | 1340 | 1340 |
| NIS | [kJ/m$^2$] | 10.2 | 9.6 | 10.4 | 9.9 |

TABLE 3b

Comparative Examples

| | | Example | | |
|---|---|---|---|---|
| | | CE1 | CE2 | CE3 |
| HECO | [wt %] | 100 | 73 | 28 |
| HDPE | [wt %] | 0 | 5 | 50 |
| CF | [wt %] | 0 | 20 | 20 |
| AP | [wt %] | 0 | 2 | 2 |
| MFR$_2$ (230° C.) | [g/10 min] | 11.4 | 5.8 | 3.7 |
| FM | [MPa] | 910 | 1420 | 1480 |
| NIS | [kJ/m$^2$] | 53 | 9.2 | 8.7 |

"HDPE" is the commercial high density polyethylene "BS4541" of Borealis AG having a MFR$_2$ (190° C./2.16 kg) of 0.7 g/10 min and a density of 964 kg/m$^3$.
"CF" is the commercial cellulosic Filtracel EFC 1000 of Rettenmaier und Söhne having a volume moment mean (D[4.3]) diameter of 162.9 μm and an aspect ratio of 4.2.
"AP" is the commercial propylene homopolymer "Scona TPPP 2112 FA" of BYK Cometra (Germany) having a maleic anydride content of 1.1 wt-%, and a melt flow rate MFR$_2$ (230° C.; 2.16 kg) of 12 g/10 min.
"FM" is the flexural modulus
"NIS" is the notched impact strength

The invention claimed is:

1. A composite comprising
   (a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;
   (b) 5.0 to 40 wt.-%, based on the total weight of the composite, of a high density polyethylene (HDPE) having a density in the range of 935 to 970 kg/m$^3$;
   (c) 5.0 to 30 wt.-%, based on the total weight of the composite, of a cellulose-based filler (CF); and
   (d) 1.0 to 8.0 wt.-%, based on the total weight of the composite, of an adhesion promoter (AP),
   wherein the composite does not comprise
   (i) a further heterophasic propylene copolymer different to the heterophasic propylene copolymer (HECO) and
   (ii) a further (semicrystalline) polypropylene different to the (semicrystalline) polypropylene (PP) of the matrix of the heterophasic propylene copolymer (HECO).

2. The composite according to claim 1 consisting of
   (a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;
   (b) 5.0 to 40 wt.-%, based on the total weight of the composite, of a high density polyethylene (HDPE) having a density in the range of 935 to 970 kg/m$^3$;
   (c) 5.0 to 30 wt.-%, based on the total weight of the composite, of the cellulose-based filler (CF);
   (d) 1.0 to 8.0 wt.-%, based on the total weight of the composite, of an adhesion promoter (AP), and
   (e) optionally, one or more of alpha nucleating agents (NU) or additives (A).

3. The composite according to claim 1 consisting of
   (a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;
   (b) 5.0 to 40 wt.-%, based on the total weight of the composite, of a high density polyethylene (HDPE) having a density in the range of 935 to 970 kg/m$^3$;
   (c) 5.0 to 30 wt.-%, based on the total weight of the composite, of the cellulose-based filler (CF);
   (d) 1.0 to 8.0 wt.-%, based on the total weight of the composite, of an adhesion promoter (AP),
   (e) optionally up to 5 wt.-%, based on the total weight of the composite, of alpha nucleating agents (NU) and
   (f) optionally up to 8.0 wt.-%, based on the total weight of the composite, of additives (A).

4. The composite according to claim 1, wherein the heterophasic propylene copolymer (HECO) has a melt flow rate MFR$_2$ (230° C., 2.16 kg) in the range of from 3.0 to 30.0 g/10 min.

5. The composite according to claim 1, wherein the heterophasic propylene copolymer (HECO) has a xylene cold soluble (XCS) fraction (25° C.) of from 15.0 to 50.0 wt.-%, based on the total weight of the heterophasic propylene copolymer (HECO).

6. The composite according to claim 1, wherein the heterophasic propylene copolymer (HECO) has a comonomer content of <30.0 mol.-%, based on the heterophasic propylene copolymer (HECO).

7. The composite according to claim 1, wherein (a) comprises one or more of the (semicrystalline) polypropylene (PP) is a (semicrystalline) propylene homopolymer (H-PP) or the elastomeric propylene copolymer (EC) is an ethylene propylene rubber (EPR).

8. The composite according to claim 1, wherein the heterophasic propylene copolymer comprises an amorphous fraction (AM), the amorphous fraction (AM) of the heterophasic propylene copolymer (HECO) has a comonomer content in the range of 30.0 to 60.0 mol.-%, based on the amorphous fraction (AM) of the heterophasic propylene copolymer (HECO).

9. The composite according to claim 1, wherein the heterophasic propylene copolymer comprises an amorphous fraction (AM), the amorphous fraction (AM) of the heterophasic propylene copolymer (HECO) has an intrinsic viscosity (IV) in the range of 1.8 to 3.2 dl/g.

10. The composite according to claim 1, wherein the high density polyethylene (HDPE) has a melt flow rate $MFR_2$ (190° C., 2.16 kg) in the range of from 0.1 to 30.0 g/10 min.

11. The composite according to claim 1, wherein the cellulose-based filler (CF) is selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxymethyl cellulose (CMC), and any mixtures thereof.

12. The composite according to claim 1, wherein the cellulose-based filler (CF) has a volume moment mean (D[4.3]) diameter between 1 and 300 μm.

13. The composite according to claim 1, wherein the adhesion promoter (AP) is selected from the group consisting of an acid modified polyolefin, an anhydride modified polyolefin and a modified styrene block copolymer.

14. The composite according to claim 2, wherein the nucleating agents (NU) are selected from the group consisting of
  (i) Salts of monocarboxylic acids and polycarboxylic acids, and
  (ii) dibenzylidenesorbitol and C1-C8-alkyl-substituted dibenzylidenesorbitol derivatives, ethyldibenzylidenesorbitol or dimethyldibenzylidenesorbitol, or substituted nonitol-derivatives, and
  (iii) salts or diesters of phosphoric acid, and
  (iv) vinylcycloalkane polymer and vinylalkane polymer, and
  (v) mixtures thereof.

15. The composite according to claim 2, wherein the additives (A) are selected from the group consisting of acid scavengers, antioxidants, colorants, light stabilisers, plasticizers, slip agents, anti-scratch agents, dispersing agents, processing aids, lubricants, pigments, and mixtures thereof.

16. A molded article comprising a composite, wherein the composite comprises:

(a) 32 to 89 wt.-%, based on the total weight of the composite, of a heterophasic propylene copolymer (HECO) comprising a (semicrystalline) polypropylene (PP) as a matrix in which an elastomeric propylene copolymer (EC) is dispersed;
(b) 5.0 to 40 wt.-%, based on the total weight of the composite, of a high density polyethylene (HDPE) having a density in the range of 935 to 970 kg/m$^3$;
(c) 5.0 to 30 wt.-%, based on the total weight of the composite, of a cellulose-based filler (CF); and
(d) 1.0 to 8.0 wt.-%, based on the total weight of the composite, of an adhesion promoter (AP),
wherein the composite does not comprise
  (i) a further heterophasic propylene copolymer different to the heterophasic propylene copolymer (HECO) and
  (ii) a further (semicrystalline) polypropylene different to the (semicrystalline) polypropylene (PP) of the matrix of the heterophasic propylene copolymer (HECO).

17. The molded article according to claim 16 being an automotive article.

18. The composite according to claim 13, wherein the adhesion promoter (AP) is a maleic anhydride functionalized polypropylene.

19. The composite according to claim 14,
wherein the salts of monocarboxylic acids and polycarboxylic acids comprise sodium benzoate or aluminum tert-butylbenzoate,
wherein dibenzylidenesorbitol comprises 1,3:2,4 dibenzylidenesorbitol,
wherein C1-C$_8$-alkyl-substituted dibenzylidenesorbitol derivatives comprise methyldibenzylidenesorbitol,
wherein ethyldibenzylidenesorbitol or dimethyldibenzylidenesorbitol comprises 1,3:2,4 di(methylbenzylidene) sorbitol),
wherein substituted nonitol-derivatives comprise 1,2,3,-trideoxy-4,6:5,7-bis-O-[(4-propylphenyl)methylene]-nonitol, and
wherein salts of diesters of phosphoric acid-comprise sodium 2,2'-methylenebis (4,6,-di-tert-butylphenyl) phosphate or aluminium-hydroxy-bis[2,2'-methylene-bis(4,6-di-t-butylphenyl)phosphate.

20. The composite according to claim 3, wherein the additives (A) are selected from the group consisting of acid scavengers, antioxidants, colorants, light stabilisers, plasticizers, slip agents, anti-scratch agents, dispersing agents, processing aids, lubricants, pigments, and mixtures thereof.

* * * * *